No. 835,879. PATENTED NOV. 13, 1906.
F. P. BOWMAN.
HARROW.
APPLICATION FILED AUG. 14, 1906.
2 SHEETS—SHEET 1.
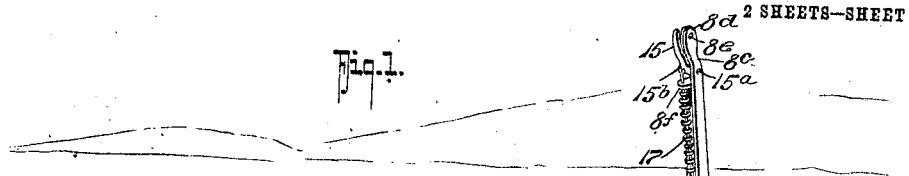
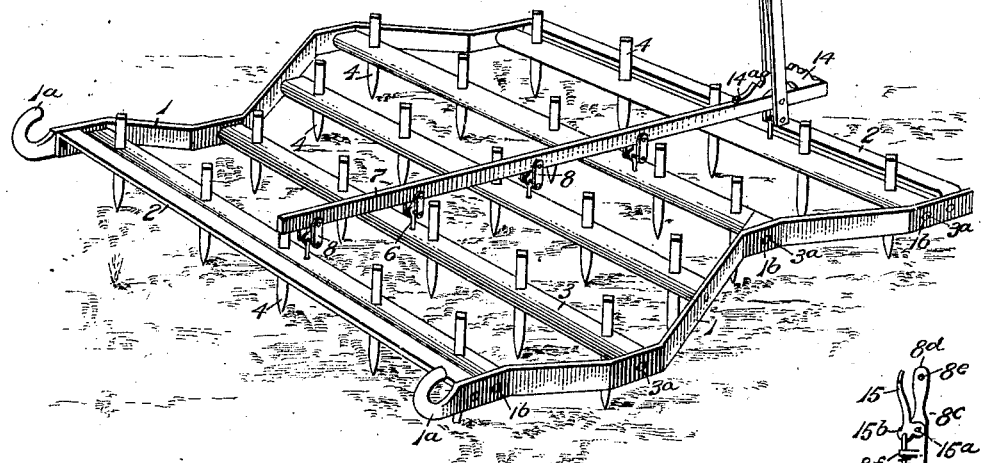
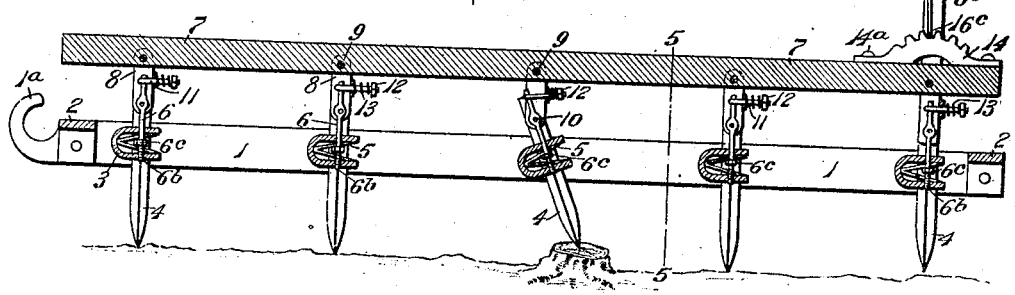
WITNESSES:
John T. Schrott
F. C. Gibson.
INVENTOR
F. P. Bowman.
BY
Fred G. Dieterich & Co.
ATTORNEYS No. 835,879. PATENTED NOV. 13, 1906.
F. P. BOWMAN.
HARROW.
APPLICATION FILED AUG. 14, 1906.
2 SHEETS—SHEET 2.
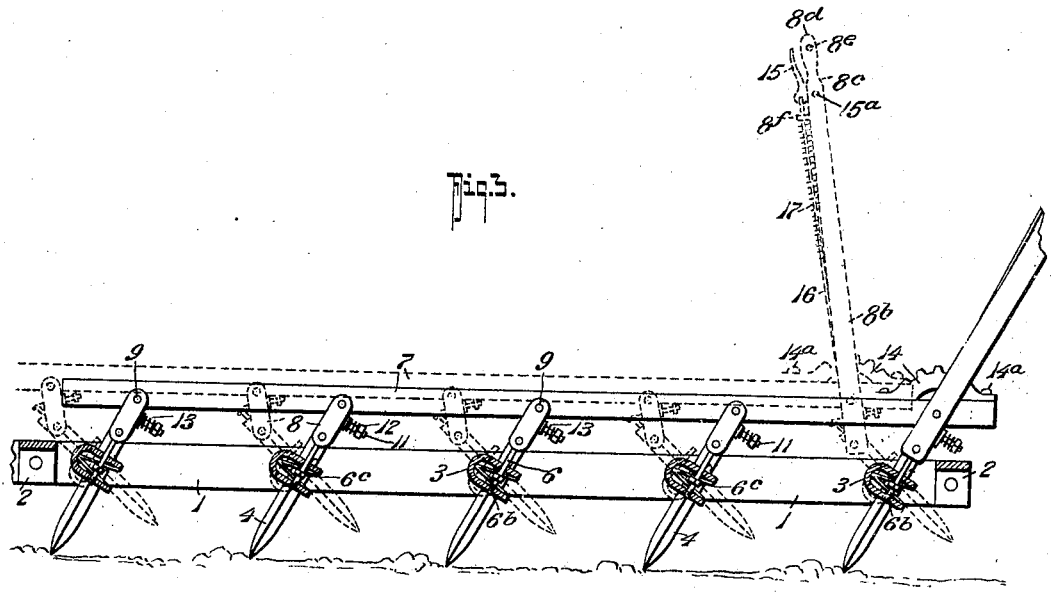
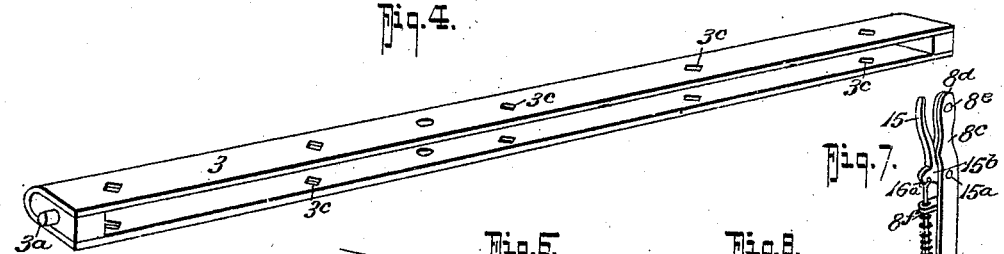
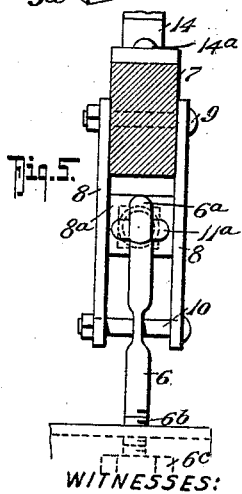
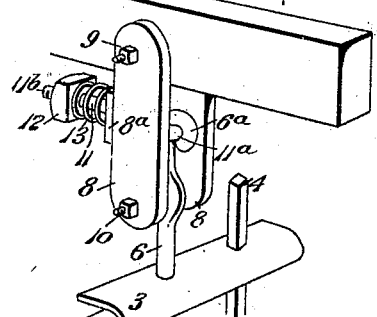
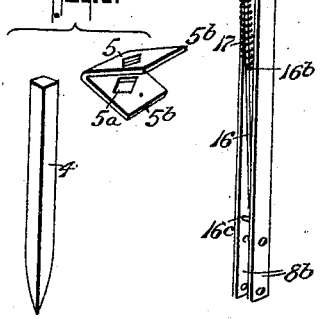
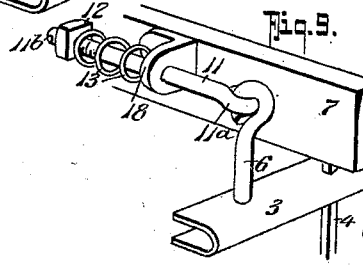
WITNESSES:
John T. Schrott
F. C. Gibson.
INVENTOR.
F. P. Bowman.
BY
Fred G. Dieterich
ATTORNEYS.

UNITED STATES PATENT OFFICE.

FRANK P. BOWMAN, OF BRIDGEWATER, VIRGINIA.

HARROW.

No. 835,879.　　　Specification of Letters Patent.　　　Patented Nov. 13, 1906.

Application filed August 14, 1906. Serial No. 330,583.

*To all whom it may concern:*

Be it known that I, FRANK P. BOWMAN, residing at Bridgewater, in the county of Rockingham and State of Virginia, have invented certain new and useful Improvements in Harrows, of which the following is a specification.

My invention relates to certain new and useful improvements in harrows, and it more particularly seeks to provide a harrow of a very simple and effective construction in which means are provided for relieving the strain on the harrow-teeth when they engage obstructions—such as rocks, stumps, &c.—
and in which means are also provided whereby the harrow-teeth may be adjusted to any desired angle, so that the harrow may be used as a harrow proper, a digger, or a crusher, as may be found desirable.

Generically, my invention comprises a harrow-frame in which a plurality of tooth-bars are pivoted, a rod or bar pivotally connected with each tooth-bar, an operating-lever connected to the rod by means of which the tooth-bar may be locked to hold the teeth at the desired angle, and devices connecting the rod with the tooth-bars, including means for relieving such tooth-bars to permit them to independently turn on their pivots when the teeth thereof engage an obstruction, so that the teeth will pass over the obstruction without moving the other tooth-bars.

With other objects in view than have been heretofore specified the invention also comprises certain novel construction, operation, and combination of parts, all of which will be first described in detail and then be specifically pointed out in the appended claims, reference being had to the accompanying drawings, in which—

Figure 1 is a perspective view of my invention. Fig. 2 is a vertical longitudinal section thereof, showing the teeth in a vertical position, one set clearing an obstruction.
Fig. 3 is a similar view, the teeth being shown in a position to convert the harrow into a digger in full lines and in a position to act as a crusher in dotted lines. Fig. 4 is a detail view of one of the tooth-bars. Fig. 5 is a detail cross-section on the line 5 5 of Fig. 2. Fig. 6 is a detail perspective view of the connection between the tooth-bars and the connecting rod or bar. Fig. 7 is a similar view of the operating-lever and its connection with the connecting-rod and tooth-bar. Fig. 8 is a detail perspective view of a tooth and its securing-spring detached. Fig. 9 is a detail perspective view of a slightly-modified form of my invention.

Referring now to the accompanying drawings, in which like numerals indicate like parts in all of the figures, 1 designates the side bars of the draft-frame, which at each end are braced by transverse bars 2 2. The side bars 1 terminate at the front in draft-hooks 1ª, as shown. The bars 1 at suitable intervals have bearing-apertures 1ᵇ, in which the bearing-studs 3ª of the tooth-bars 3 are fulcrumed. The tooth-bars 3 comprise a member substantially U-shaped in cross-section, provided at suitable intervals with tooth-receiving apertures 3ᶜ in the flats of the bar, in which the teeth 4 fit, and to hold the teeth 4 in place I form them angular in cross-section and the apertures 3ᶜ to correspond.

Between the flats of the U-shaped bar 3 are V-shaped locking-strings 5, through which the teeth 4 pass, the springs 5 having apertures 5ª for such purpose, which are slightly greater in area than the cross-sectional area of the teeth to permit the springs 5 to expand and cause their ends 5ᵇ to engage the faces of the flats in the bars 3, and by reason of the resiliency of the arms of the springs the teeth will be locked in the bar 3, as will be readily understood from the drawings. When a tooth is to be inserted, it should be stated the spring 5 is compressed and the tooth forced through the aperture therein, after which the spring is released and automatically springs into position. To remove a tooth, the spring 5 is again compressed to loosen its hold on the teeth, which may be then withdrawn.

Secured to each tooth-bar 3 is a bolt or rod 6, having an eye 6ª and a threaded shank 6ᵇ, which passes through the flats of the tooth-bar and may have a secure connection therewith, a nut 6ᶜ held between the flats of the bar 3 being provided for locking the bolt 6 in position, the bar 3 in this case serving as a nut-lock to prevent the nut 6ᶜ from turning.

7 designates a flat rod which is held over the tooth-bars and to which a pair of pendent hangers 8 are pivotally secured by bolts 9 passing through the rod 7. One pair of these hangers is provided for each tooth-bar, and the lower ends of the hangers 8 are connected by a cross-bolt 10, which passes through an aperture in the tooth-bar bolt 6 and pivotally connects such tooth-bar bolt 6 with the hangers 8. In practice the said hangers 8 of each pair are arranged close together and may be provided with a crossbridge or bar 8$^a$ to connect the hangers 8 together and also to serve as a stop in the manner now to be explained. The bridge or cross-bar 8$^a$ is centrally apertured to permit passage of a second bolt 11 of similar form to the bolt 6, and the bolt 11 is provided with a hook or eye 11$^a$ to receive the eye 6$^a$ of the bolt 6, and the rod or bolt 11 passes through the bridge 8$^a$ and is screw-threaded on its end, as at 11$^b$, to receive the check-nuts 12 and a coil-spring 13, that abuts the stop 8$^a$, it being understood that when the parts are in their normal position (shown in Figs. 1 and 2) the bridge 8$^a$ will be engaged by the eyes 11$^a$ and 6$^a$ and form a stop for the bolt 6 to prevent the tooth-bars swinging forward unnecessarily, and thus prevent interference with their proper operation. At the rear the rod 7 is provided with a segmental rack 14, secured to such bar 7 by rivets 14$^a$ or otherwise, as indicated, and the hangers 8 of the rear tooth-bar are projected upwardly, as at 8$^b$, and bent toward each other, as at 8$^c$, to form a handle member, the ends 8$^d$ of the bars 8$^b$ being riveted or otherwise secured together, as at 8$^e$, as shown, to form a hand-engaging portion.

Between the bars 8$^b$ of the lever I fulcrum a latch-controlling lever 15 on pivots 15$^a$, which lever 15 has a heel portion 15$^b$. The latch-rod 16 is pivotally connected by a handle-piece 16$^a$. The rod 16 passes through an aperture in the lug 8$^f$ in the lever member 8$^b$ and is provided with a coil-spring 17, one end of which engages the lug 8$^f$ and the other end engages a pin 16$^b$ on the rod 16. The latch end of the rod 16 has a right-angled projection 16$^c$, adapted to engage the rack-teeth of the rack 14.

When my improved apparatus is to operate as a harrow and the parts are in the position shown in Figs. 1 and 2, the buffer-springs 13 will be at their normal tension, which tension can be regulated and controlled by the nuts 12.

In Fig. 9 I have shown a slightly-modified view of my invention in which the bolt or rod 11 passes through an aperture in a lug 18, fastened to the bar 7 in any desired manner, and in this form of my invention the hangers 8 are eliminated.

From the foregoing it will be seen that I have provided a very simple and effective construction of harrow in which the various adjustments of the teeth can be readily made and which embodies all the essential advantages of a rigid or spike tooth harrow, as well as those of the so-called "spring-tooth" type. The means for securing the tooth in the tooth-bar enables the teeth to be readily replaced when broken or worn without dismembering the apparatus and without affecting the remaining teeth of the bar. Again, by having the tooth-bars adjustable a greater range of work is possible with this harrow than with rigid-tooth harrows now in common use. By mounting the tooth-bars as shown only that bar whose tooth is passing over an obstruction is inactive during such period, since as soon as the individual bar passes over the obstruction it springs back to its normal position and is again at work ere the next following tooth-bar meets the obstruction.

From the foregoing description, taken in connection with the accompanying drawings, it is thought the complete construction, operation, and many advantages of my invention will be readily understood, and I desire to say that slight changes in the detailed construction and arrangement of parts may be made without departing from the scope of the invention or that of the appended claims.

What I claim is—

1. A harrow comprising in combination, a draft-frame, a plurality of tooth-bars fulcrumed therein, a connecting-rod passing over said tooth-bars, pendent hangers secured to said connecting-rod, means pivotally connecting said hangers with said tooth-bars, and buffer-springs coöperating with said last-named means, substantially as shown and described.

2. In a harrow, pivoted tooth-bars, means for adjusting said bars to various positions, buffer devices for each bar, said buffer devices comprising bolt members secured to said tooth-bars, other bolt members secured to said first-named bolt members and connected with said adjusting means, and spring devices carried by said last-named bolt members, substantially as shown and described.

3. In a harrow, the combination with a draft-frame, tooth-bars pivotally secured therein, eyebolts projecting upwardly from said tooth-bars and detachably secured thereto, an adjusting-bar, means pivotally connecting said eyebolt with said adjusting-bar, buffer-spring devices coöperating with said last-named means and said tooth-bar eyebolts, substantially as shown and described.

4. The combination with a draft-frame, tooth-bars pivotally mounted therein, bolts detachably secured to said tooth-bars and projecting upwardly therefrom, an adjusting-bar held over said tooth-bars, supplemental bolts pivotally connected with said first-named bolts and connected with said adjusting-bar, buffer-springs carried by said supplemental bolts, and means for adjusting said adjusting-bar.

5. The combination with a draft-frame, tooth-bars pivotally mounted therein, bolts detachably secured to said tooth-bars and projecting upwardly therefrom, an adjusting-bar held over said tooth-bars, supplemental bolts pivotally secured with said first-named bolts and connected with said adjusting-bar, buffer-springs carried by said supplemental bolts, means for adjusting said adjusting-bar, said last-named means comprising a lever pivotally secured to said adjusting-bar and connected with said toothbars, a rack member carried by said adjusting-bar, and latch devices carried by said lever for engaging said rack-bar, substantially as shown and described.

6. In a harrow, the combination with a draft-frame, tooth-bars pivotally mounted therein, eyebolts projecting upwardly therefrom, an adjusting-bar held over said tooth-bars, hangers pivotally secured to said adjusting-bar, and said eyebolts, supplemental eyebolts pivotally connected with said first-named eyebolts and projecting into a plane approximately parallel with that containing the adjusting-bar, and means for adjusting said adjusting-rod, substantially as shown and described.

7. In a harrow, the combination with a draft-frame, tooth-bars pivotally mounted therein, eyebolts projecting upwardly therefrom, an adjusting-bar held over said tooth-bars, hangers pivotally connected to said adjusting-bar and said eyebolts, supplemental eyebolts pivotally connected with said first-named eyebolts and projecting in a plane approximately parallel with that containing the adjusting-bar, means for adjusting said adjusting-bar, and means carried by the supplemental eyebolts for adjusting the tension of the buffer-springs, substantially as shown and described.

8. In a harrow, the combination with a draft-frame, pivoted tooth-bars carried thereby, said tooth-bars being U-shaped in cross-section, eyebolts passing through said tooth-bars and projecting upwardly therefrom, nuts held between the flats in said tooth-bars for securing said eyebolts, an adjusting-rod held over said tooth-bars, supplemental eyebolts pivotally connected with said first-mentioned eyebolts, means connecting said supplemental eyebolts with said adjusting-rod and buffer-springs carried by said supplemental eyebolts, and means for adjusting said adjusting-rod, substantially as shown and described.

9. In a harrow, the combination with a draft-frame, pivoted tooth-bars carried thereby, said tooth-bars being U-shaped in cross-section, eyebolts passing through said tooth-bars and projecting upwardly therefrom, nuts held between the flats in said tooth-bars for securing said eyebolts, an adjusting-rod held over said tooth-bars, supplemental eyebolts pivotally connected with said first-mentioned eyebolts, means connecting said supplemental eyebolts with said adjusting-rod, buffer-springs carried by said supplemental eyebolts, means for adjusting said adjusting-rod, said eyebolt and adjusting-bar connecting means comprising hangers secured to said adjusting-rod and pivotally connected with said first-mentioned eyebolts, a bridge member carried by said hangers and apertured to permit passage of said supplemental eyebolts, substantially as shown and described.

10. In a harrow, the combination with a draft-frame, pivoted tooth-bars secured therein, rods projected upwardly from said tooth-bars, supplemental rods pivotally connected to said first-mentioned rods, and projecting at an angle thereto, adjusting-bars held over said tooth-bars, and means connecting said adjusting-rod with said first-mentioned tooth-bar rods, and said supplemental rods, substantially as shown and described.

11. In a harrow, the combination with a draft-frame, pivoted tooth-bars secured therein, rods projected upwardly from said tooth-bars, supplemental rods pivotally connected to said first-mentioned rods, and projecting at an angle thereto, adjusting-bars held over said tooth-bars, means connecting said adjusting-rod with said first-mentioned tooth-bar rods and said supplemental rods, said last-named means including buffer-springs carried by said supplemental rod, substantially as shown and described.

12. In a harrow, the combination with a draft-frame, pivoted tooth-bars secured therein, rods projected upwardly from said tooth-bars, supplemental rods pivotally connected to said first-mentioned rods, and projecting at an angle thereto, adjusting-bars held over said tooth-bars, means connecting said adjusting-rod with said first-mentioned tooth-bar rods and said supplemental rods, said last-named means including buffer-springs carried by said supplemental rod, and means for adjusting the tension of said buffer-springs, substantially as shown and described.

13. In a harrow, the combination with a draft-frame, pivoted tooth-bars mounted therein, of an adjusting-rod held over said tooth-bars, a pair of hangers pivotally connected with said adjusting-bar, rods detachably secured to said tooth-bars and projecting upwardly between said hangers and pivotally connected therewith, buffer-springs connected with said last-named rods, a pair of said hangers having upwardly-projecting portions to form a lever, a segmental rack secured to said adjusting-bar and passing over such lever, latch devices carried by said lever for engaging said rack, substantially as shown and described.

14. In a harrow, the combination with a draft-frame and pivoted tooth-bars mounted thereon, of an adjusting-bar pivotally connected with said tooth-bars, means for adjusting said adjusting-bar, said adjusting means comprising hangers pivotally secured to said adjusting-bar and said tooth-bars, said hangers projecting upwardly and merging with each other to form a handle member, means for securing said merged portions of the hangers together to form a hand-engaging portion, a segmental rack secured to said adjusting-bar between said hangers, a latch-rod carried by said lever member, means for operating said latch-rod pivotally secured to said lever member adjacent the hand-engaging portion thereof, and spring devices for normally holding said latch-rod in engagement with the hanger, substantially as shown and described.

FRANK P. BOWMAN.

Witnesses:
G. A. SNELL,
G. RICHARD BERLIN.